US012797862B2

(12) United States Patent
Engelke et al.

(10) Patent No.: US 12,797,862 B2
(45) Date of Patent: Nov. 17, 2026

(54) VEHICLE HAVING A DEVICE FOR CAPTURING DUST PARTICLES

(71) Applicant: Ford Global Technologies, LLC, Dearborn, MI (US)

(72) Inventors: Julius Maximilian Engelke, Aachen (DE); Marcel Mathissen, FÜbach-Palenberg (DE); Volker Scheer, Roetgen (DE); Rainer Vogt, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 397 days.

(21) Appl. No.: 18/419,662

(22) Filed: Jan. 23, 2024

(65) Prior Publication Data

US 2024/0261797 A1 Aug. 8, 2024

(30) Foreign Application Priority Data

Feb. 2, 2023 (DE) ......................... 102023102532.5

(51) Int. Cl.
*B03C 3/36* (2006.01)
*B03C 3/82* (2006.01)

(52) U.S. Cl.
CPC .................. *B03C 3/36* (2013.01); *B03C 3/82* (2013.01); *B03C 2201/30* (2013.01)

(58) Field of Classification Search
CPC ........... B60S 1/62; B62D 25/20; B62D 21/11; B60R 19/00; B03C 3/36; B03C 3/82; B03C 2201/30; B03C 3/16; B03C 3/361; B03C 3/78; B03C 3/017; B05B 5/00; B65G 33/00; F16D 65/0031; B01D 45/00; B01D 47/06
See application file for complete search history.

(56) References Cited

U.S. PATENT DOCUMENTS 730,638 A * 6/1903 Griffiths .................. B60B 9/005 295/30
3,982,579 A * 9/1976 Mirtain ................... B60C 11/01 152/209.16
5,203,933 A * 4/1993 Nagahisa .............. B60C 11/032 152/209.15

(Continued)

FOREIGN PATENT DOCUMENTS

DE 201126 C 6/1906
DE 10329961 A1 1/2005

(Continued)

OTHER PUBLICATIONS

German Search Report for German Patent Application No. 102023102532.5 created on Oct. 23, 2023.

*Primary Examiner* — Jennifer Dieterle
*Assistant Examiner* — Sonji Turner
(74) *Attorney, Agent, or Firm* — Vichit Chea; Carlson, Gaskey & Olds, P.C.

(57) ABSTRACT

A vehicle has a device for capturing dust particles that are generated and/or resuspended by movements, in particular of a wheel of the vehicle. The wheel is surrounded by a wheel well at which there is arranged a guide channel that has at least one inlet opening. The guide channel has a liquid-spraying system. A collecting element has a conveying system that is arranged at the guide channel. The conveying system is connected to a capturing container.

20 Claims, 2 Drawing Sheets

(56) References Cited

U.S. PATENT DOCUMENTS

| | | | | |
|---|---|---|---|---|
| 6,129,127 | A * | 10/2000 | Nicotina | B60C 11/0306 152/902 |
| 6,470,935 | B1 * | 10/2002 | Fulsang | B60C 17/009 152/339.1 |
| 6,821,320 | B1 * | 11/2004 | Miyazaki | B03C 3/011 96/17 |
| 9,795,913 | B1 * | 10/2017 | Flora | A01D 51/002 |
| 10,286,882 | B2 | 5/2019 | Mathissen et al. | |
| 10,352,854 | B2 | 7/2019 | Mathissen et al. | |
| 11,002,324 | B2 | 5/2021 | Kunzler et al. | |
| 2008/0029357 | A1 * | 2/2008 | Krantz | B60L 15/2036 219/202 |
| 2017/0210354 | A1 * | 7/2017 | Mathissen | B01D 45/12 |
| 2020/0002335 | A1 | 1/2020 | Espensen et al. | |
| 2020/0331005 | A1 * | 10/2020 | You | B03C 3/47 |
| 2021/0254681 | A1 * | 8/2021 | Pasquet | F16D 65/0031 |
| 2023/0407929 | A1 * | 12/2023 | Adamczak | B01D 46/70 |

FOREIGN PATENT DOCUMENTS

| | | | | |
|---|---|---|---|---|
| DE | 202005005673 U1 | | 9/2005 | |
| DE | 202006004522 U1 | | 6/2006 | |
| DE | 202006019335 U1 | | 4/2008 | |
| DE | 102016224432 A1 | | 6/2017 | |
| DE | 102016200936 A1 | | 7/2017 | |
| DE | 102019209793 A1 | | 1/2021 | |
| DE | 102021003436 A1 | * | 11/2021 | F16D 65/0031 |
| KR | 101511663 B1 | | 4/2015 | |
| KR | 101801748 B1 | * | 11/2017 | B61D 49/00 |
| WO | WO-2015199412 A1 | * | 12/2015 | F16D 65/0031 |
| WO | WO-2021152331 A1 | * | 8/2021 | B03C 3/78 |

* cited by examiner

VEHICLE HAVING A DEVICE FOR CAPTURING DUST PARTICLES

CROSS-REFERENCE TO RELATED APPLICATIONS

This disclosure claims priority to German Patent Application No. 102023102532.5, which was filed on 2 Feb. 2023 and is incorporated herein by reference in its entirety.

TECHNICAL FIELD

The present disclosure relates to a vehicle having a device for capturing dust particles that are generated and/or resuspended by movements of the vehicle, in particular movements of a wheel. The wheel can be accommodated in a wheel well at which there is arranged a guide channel that has at least one inlet opening.

BACKGROUND

Traffic-related particle emissions may exist from wear of brakes, tires, clutches, road surfaces etc., and from resuspension of road dust.

Airborne particles may be generated as a result of wear processes at the interface between tire and road, which lead to tire and road wear and to resuspension of road dust. These particles are dispersed around the vehicle wheel and in the wake of the vehicle.

To reduce brake dust emissions in particular, there are known technologies such as shielding means, blowers and dust collectors.

DE 103 299 61 A1 discloses an integrated fine-dust suctioning device for vehicles, by means of which fine dusts can be filtered out of the ambient air and collected for scientific examination, which fine dusts can also be analyzed, whilst being collected, by means of an aerosol spectrometer as a dust measuring unit, wherein the measured data can be transmitted by radio.

DE 10 2019 209 793 A1 relates to a system for separating off tire particles in a controlled manner, having a tire, having a support structure on which the tire is rotatably mounted, having a charging module, fastened to the support structure, for electrically charging tire particles, and having a deposition module, fastened to the support structure, for capturing the charged tire particles, when the charging module and the deposition module are arranged, offset with respect to one another in a circumferential direction, directly at the tire.

U.S. Pat. No. 11,002,324 B2 discloses a brake system for collecting brake dust that is generated as a result of the operation of a brake mechanism. The brake system comprises a collecting device that is coupled to a brake mechanism. The collecting device may comprise a cover, which surrounds the brake mechanism, and a collecting element, which is coupled to the cover, for collecting brake dust that emerges from the cover. When the collecting device is coupled to the brake mechanism, most or all of the brake dust that is emitted by the brake mechanism during the operation of the brake mechanism, such as copper or other particles from the brake mechanism, can be removed from the brake mechanism and collected by the filter of the collecting mechanism.

Motor vehicles which are intended to remove fine dusts from the ambient air during travel have also already been proposed.

For example, DE 20 2006 019 335 U1 discloses a fine-dust suctioning device for vehicles, by means of which fine dusts can be removed from the fresh air that is supplied to the vehicle interior compartment, but by means of which it is also possible to reduce the fine dust content in the ambient air.

KR 101 511 663 B1 discloses a motor vehicle having a channel which extends in the wheel well and which, during travel, takes in air laden with resuspended dust and conveys said air through a dust filter.

DE 20 2006 004 522 U1 discloses a fine dust filter which operates with electrical and/or magnetic separation and which is arranged between an air inlet grille and a radiator of a vehicle in order to remove fine dusts from the ambient air flowing through there, including fine dusts that have been emitted or resuspended by other vehicles.

DE 20 2005 005 673 U1 discloses an external-air filter for motor vehicles for generally reducing air pollution, said external-air filter being installed under a bumper.

DE 10 2016 200 936 A1 discloses a motor vehicle having at least one air-guiding structure, arranged behind a vehicle wheel in relation to a direction of travel, for guiding at least a proportion of the air in the wake of the vehicle wheel to a dust collector, wherein a device is provided for automatically adjusting the spacing between a bottom edge of the air-guiding structure and a roadway surface, on which the vehicle is traveling, in accordance with the traveling speed of the vehicle.

US 2020 002 335 A1 discloses a fine-dust collecting device which is free from exhaust gas and which uses triboelectricity. The intention is to provide a fine-dust collecting device which is free from exhaust gas. The device uses triboelectricity and can include the following: an air pipe which is installed in a vehicle and which has an inlet through which fine dust that has been generated in a vehicle and has been charged with a first polarity flows together with air; and a dust collector which is installed at one side of an outlet of the air pipe and is charged with a second polarity that is opposite to the first polarity in order to collect the fine dust that has been charged with the first polarity.

WO 2021 152 331 A1 discloses a particle collecting device which can be attached to a vehicle in order to collect or capture particles that have been released from a tire or a wheel of the vehicle as a result of wear or and/or resuspension when the vehicle is being driven on a roadway surface. The particle collecting device comprises an electrostatic filter unit which, in an operating position, can be installed in the immediate vicinity of the tire or of the wheel of the vehicle in order to capture a flow of particles from a contact point between the tire or wheel and the roadway surface. The filter unit is configured to collect or capture particles in the flow by electrostatic attraction.

Such systems could effectively reduce fine dust in the environment only if they were installed in a very large number of vehicles, and the effort involved in cleaning the many filters and in disposing of the collected dusts would be extreme, especially since relatively coarse dusts, and the filters would quickly become full.

DE 10 2016 224 432 A1 claims the priority of DE 10 2015 224 725 and discloses a motor vehicle having a light-scattering photometer for measuring a particle concentration in a particular area of the motor vehicle. It is proposed that the light-scattering photometer be arranged in an area of the motor vehicle in which dust that is resuspended by the wheels of the vehicle or emitted by the brakes of the vehicle during travel tends to be encountered, and that the motor vehicle have a device for reducing dust resuspension or dust emission by the wheels or brakes, which device receives the measurement data from the light-scattering photometer, decides on the basis of the measurement data whether measures should be implemented against dust resuspension or dust emission by the wheels or brakes, and implements corresponding measures if necessary. The teaching of DE 10 2016 224 432 A1 makes it possible to limit the restrictions and the effort involved in reducing the resuspension or release of fine dust or dust by wheels or brakes, because the measures thereof can be limited to phases involving particularly high levels of dust resuspension or emissions.

SUMMARY

A vehicle collects the dusts that are emitted by the vehicle itself and resuspended dusts, that is to say dusts from wear of brakes, tires, clutches, road surfaces etc. and from resuspension of road dust. According to the invention, the object is achieved by a vehicle having the features of Claim 1.

For purposes of this disclosure, “dust particles” encompasses all dust particles that are emitted by the vehicle itself and dust particles that are external to the vehicle. Dust particles includes fine and coarse dust particles that form, for example, as a result of tire wear and/or brake wear and which are also resuspended from the roadway surface.

In a first aspect, a vehicle having a device for capturing dust particles that are generated and/or resuspended by movements, in particular of a wheel of the vehicle, is specified, wherein the wheel is surrounded by a wheel well at which there is arranged a guide channel that has at least one inlet opening. The guide channel can have a liquid-spraying system. A collecting element having a conveying system can be arranged at the guide channel. The conveying system can be connected to a capturing container.

Note that the features and measures individually specified in the following description may be combined with one another in any technically meaningful way and reveal further refinements of examples of this disclosure.

In exemplary embodiments of the present disclosure, a vehicle is provided which particularly effectively collects dusts emitted or resuspended by the vehicle itself, that is to say from wear of brakes, tires, clutches, road surfaces etc. and from resuspension of road dust. In the context of this disclosure, the term “dust” is synonymous with the terms “fine dust”, “coarse dust”, “dust particles”, “particles” or the like. In the context of this disclosure, a vehicle includes any motor vehicles, such as passenger motor vehicles, heavy goods vehicles, buses, minivans, SUVs and the like, which have an internal combustion engine and/or other drive assemblies such as electric motors. In this respect, the term “vehicle” also includes hybrid vehicles, which have a combination of different drive assemblies, and electric vehicles.

As soon as the vehicle starts moving, it is for example the case that dust is resuspended from the roadway surface. This dust passes through the at least one inlet opening into the guide channel. In order to prevent excessively large objects, that is to say objects that could for example block the guide channel, from entering, a protective grille is arranged at the at least one inlet opening, said protective grille having a mesh size that is suitable for allowing the particles that are to be collected to pass through. The inlet opening is arranged in particular in an area of the guide channel close to the roadway, and in particular in a rear-side area of the wheel well, for which reason said inlet opening can also be referred to as a rear-side inlet opening. During forward travel of the vehicle, it is thus possible, for example, for resuspended dust particles to be collected. The air flow entering the channel is conducted such that it emerges at the front-side area of the wheel well. It is also conceivable that, during reverse travel, for example, resuspended dusts can be collected through said opening in the front-side area of the wheel well. Said opening can also be referred to as a front-side inlet and outlet opening. The front-side inlet and outlet opening is also preferably equipped with a protective grille as described above.

In a preferred refinement, provision is made for the wheel to be fully housed by the guide channel. This measure is expedient because the dust that is emitted and resuspended by the vehicle remains in the guide channel. Here, the above-described refinement of the guide channel with the inlet openings arranged at the front side and at the rear side is particularly favorable. In particular, in order to cover the visible side situated opposite the wheel well, a covering element may be arranged at the guide channel or at the wheel well, which covering element largely closes off the wheel well at the visible side.

In a further preferred refinement, provision may be made whereby the guide channel has a multiplicity of guide elements. The particles situated in the guide channel can be separated off at said guide elements. The guide elements may be designed as air-guiding vanes. In particular, the guide elements may have a curved profile. In an expedient refinement, guide elements that respectively follow one another may be oppositely curved, that is to say may be alternately concavely or convexly curved. In particular, provision may be made whereby, in relation to a tread of the wheel, those guide elements which are closest to the tread in a radial direction have a concave curvature, whilst those guide elements which are spaced apart further from the tread in the radial direction of the wheel may have a convex curvature.

The liquid-spraying system assists the dust separation by wetting the surface firstly of the guide elements and secondly of the particles, thus preventing the particles from returning to the air. In a preferred refinement, the liquid-spraying system has at least one spray nozzle by means of which liquid can be introduced into the guide channel, the at least one spray nozzle preferably being designed such that a fine spray mist is generated. In particular, the liquid-spraying system may be a high-pressure spraying system, wherein a correspondingly designed high-pressure pump may be provided for generating high pressure. In particular, water or some other liquid may be provided as spray liquid.

In a preferred refinement, in order that the efficiency of the particle separation can be further increased, provision is made whereby the liquid-spraying system is connected to a voltage source, in particular to a high-voltage source. In particular, the at least one spray nozzle is connected to the voltage source or to the high-voltage source. The liquid droplets atomized by the spray nozzle can thus be charged, such that the efficiency of the particle separation in the air is increased by electrostatic attraction between tire/dust particles and the charged liquid droplets and/or the guide elements.

Furthermore, the high pressure of the spray liquid causes the mixture of liquid and dust particles to be conveyed in the direction of the collecting element, this being assisted by the shaping of the guide elements. It is likewise possible for a separate scraper to be provided which acts in an assisting manner, or on its own, to convey the particles along the guide channel in the direction of the collecting element.

It is expedient that the particles thus pass into the collecting element. In a preferred refinement, the collecting element is designed as a collecting channel, wherein the conveying system has a conveying means that is arranged in the collecting element. The conveying means arranged in the collecting element is designed in particular as a screw conveyor with a scraping conveying action. In particular if a flexible shaft is used, said screw conveyor is particularly flexibly adaptable even to a curved profile of the collecting element. The liquid-particle mixture that has been collected in the collecting element is transported by the conveying means to a collecting point. In particular, the collecting element in this case extends along a lower edge of the wheel well.

In another example, the conveying system has not only the conveying means but also a discharging conveying means that is arranged between the collecting element and the capturing container. In particular, the discharging conveying means is arranged between the collecting point and the capturing container. The discharging conveying means can be a screw conveyor.

In another example, the capturing container is arranged on, in particular fastened to, an underbody of the vehicle. This includes a situation in which the capturing container is arranged geodetically higher than the collecting element, for which reason the discharging conveying means overcomes this height difference.

The liquid-particle mixture is collected in the capturing container and can be fed to a liquid circuit. In a further preferred refinement, the capturing container has a filter element such that the liquid laden with dust particles can pass, having had the dust particles filtered out, into a liquid reservoir of the capturing container. The liquid reservoir is connected to a line in which the aforementioned high-pressure pump, and a fine filter upstream thereof, are arranged. From the high-pressure pump, the filtered liquid is fed to the at least one spray nozzle. A virtually closed liquid circuit is thus formed. Liquid losses are however to be expected, wherein liquid can be fed externally to the liquid reservoir in order to compensate for these. In order to be able to identify such level deficiencies in the liquid reservoir, it is possible in particular for a liquid level sensor to be arranged at the liquid reservoir. If said liquid level sensor registers that a fill level of the liquid reservoir is too low, the user of the vehicle is prompted to fill said liquid reservoir. If the liquid level of the liquid reservoir is below a minimum liquid level, a discharge of liquid for the purposes of providing a supply to the spray nozzle is prevented until the liquid reservoir has been refilled.

The capturing container or the filter element thereof also has only a finite capturing capacity, for which reason this should be cleaned on a time-controlled basis, that is to say at regular intervals, and/or on a sensor-controlled basis, wherein a corresponding signal to empty the filter element may be output to the user of the vehicle. After the collected dust has been removed, a reward message may be output to the user via a corresponding interface, for example to the effect that they have collected xx g of tire/road dust from the environment.

In a further example, a method for operating a vehicle having a device for capturing dust particles that are generated and/or resuspended by movements of the vehicle, in particular of a wheel, is presented, wherein the wheel is accommodated in a wheel well at which there is arranged a guide channel that has at least one inlet opening. The guide channel can have a liquid-spraying system. A collecting element having a conveying system can be arranged at the guide channel. The conveying system can be connected to a capturing container. The method can include at least the following steps: activating a liquid-spraying system such that a liquid-particle mixture is captured by the collecting element, and activating a conveying means of the conveying system in the collecting element such that the liquid-particle mixture is conveyed to a collecting point, and activating a discharging conveying means of the conveying system such that the liquid-particle mixture is conveyed from the collecting point into the capturing container, and filtering the liquid-particle mixture such that filtered liquid is conducted into a liquid reservoir of the capturing container, from which liquid reservoir the spray liquid is supplied by pumped conveyance to at least one spray nozzle of the liquid-spraying system.

The features mentioned above with regard to the vehicle are correspondingly associated with the method. In particular, the method can be used to operate the vehicle in accordance with any one of the abovementioned refinements or in accordance with a combination of at least two of said refinements with one another.

The method may be stored in a control unit that can actuate the individual elements of the device. The control unit may be stored and/or integrated in an existing central control device (CPU) of the vehicle.

In some examples of the method, the liquid-spraying system is activated only when it is identified that: particle emissions generated by the vehicle itself, and/or particle emissions generated outside the vehicle, exceed a limit value owing to dust resuspension, and/or if it is identified that the present vehicle and surroundings limit values have been exceeded, and/or if it is identified that a liquid level in a liquid reservoir of the capturing container is above a minimum liquid level.

The conditions for activating the liquid-spraying system may be monitored using measuring systems, for example by means of sensors. The sensors transmit their measurement results to the control unit, which generates corresponding signals for controlling the liquid-spraying system. Vehicle and surroundings limit values may be in determined for example by means of rain sensors, speed sensors, steering angle sensors, longitudinal and/or lateral acceleration sensors, tire pressure sensors, GPS data, tire rotational speed and torque sensors, temperature sensors and/or air humidity sensors. Devices that estimate dust emissions using camera means, and/or sensor-based wheel well measurements, may also be used.

For example, the liquid-spraying system is activated when the vehicle is at a certain minimum speed, such that particles are resuspended from the roadway or said vehicle can itself emit particles. At the same time, it is detected that it is not raining or that the air humidity is so low that moistening of the resuspended dust particles, for example, is not to be expected. At the same time, the liquid reservoir must have a corresponding fill level. If the conditions, which have been stated merely as examples, are satisfied cumulatively, the liquid-spraying system can be activated by virtue of the pump being activated, wherein the connection to the voltage source may be switched at the same time in order to facilitate the separating action. By contrast, if it is raining or if the air humidity is at such a level that moistening of dust particles and/or of the guide elements can be expected, then it is not imperative for the pump, or the high-pressure pump, to be activated. However, the voltage source or the high-voltage source can be activated at any time in order that the particles are thus separated off.

The conveying means in the collecting element does not need to be activated at the same time as the liquid-spraying system or at the same time as the activation of the pump. In a further preferred refinement, the conveying means is activated only when it is identified that the collecting element has been filled up to a certain level. This may be determined for example by means of corresponding sensors that record the fill level over the entire extent of the collecting element. If a maximum possible fill level has been reached only at one point, the conveying means is activated. The maximum fill level may for example correspond to a partial volume, for example three quarters of the volume, of the collecting element at the point in question. The conveying means conveys the liquid-particle mixture to a collecting point at which the discharging conveying means is arranged.

In a further example, the discharging conveying means is activated at the same time as the conveying means. The liquid-particle mixture is thus conveyed into the capturing container and passes through a filter element. Said filter element filters the particles such that the liquid from which the particles have been removed is conducted into the liquid reservoir, from which it is conveyed to the spray nozzle again by pumped conveyance.

In another example, provision is made for the filter element to be cleaned when a timer and/or a filter sensor generates a corresponding signal. For this purpose, the user of the vehicle may be prompted to drive to a corresponding collecting location at which the filter is cleaned. It is not imperatively necessary for the capturing container or the filter element to be uninstalled for this purpose. Once the filter has been cleaned, a corresponding signal can be output to the user, wherein a reward message is also output regarding the discharged and thus collected dust quantity that has been removed from the environment owing to the collecting action by the vehicle.

Further refinements are disclosed in the subclaims and in the following description of the figures.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

For a better understanding of the present disclosure, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further in the figures, like reference numbers refer to like parts throughout the different figures.

In the various figures, identical parts are always denoted by the same reference designations, for which reason said parts will generally also be described only once.

DETAILED DESCRIPTION

Figure 1:
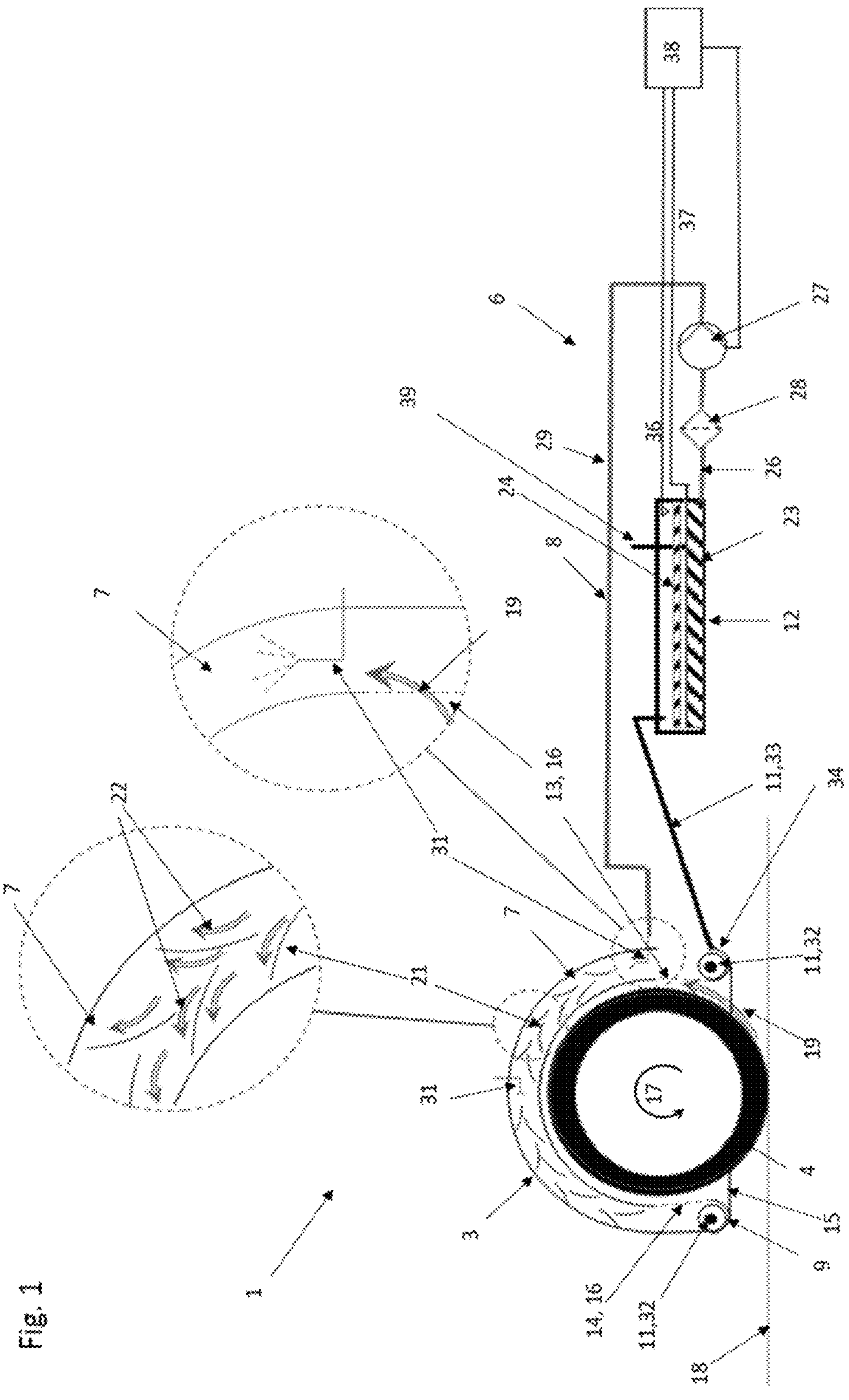
FIG. 1 shows a vehicle having a device for capturing dust particles that are generated and/or resuspended by movements of the vehicle, in particular of a wheel.

FIG. 1 shows a partial view of a vehicle 1, with one of the wheel wells 3 and the associated wheel 4 being illustrated. The other wheel wells of the vehicle 1 are not shown. In the exemplary embodiment shown in FIG. 1, a front wheel of the vehicle is illustrated. The vehicle 1 has a device 6 for capturing dust particles that are generated and/or resuspended by movements, in particular movements of a wheel 4 of the vehicle. The wheel 4 is surrounded by the wheel well 3, at which there is arranged a guide channel 7 that has at least one inlet opening 13, 14. The guide channel 7 has a liquid-spraying system 8. A collecting element 9 having a conveying system 11 is arranged at the guide channel 7. The conveying system 11 is connected to a capturing container 12.

In this exemplary embodiment, the guide channel 7 has a rear-side inlet opening 13 and a front-side inlet and outlet opening 14. The inlet openings 13 and 14 are each open in the direction of the wheel 4 and equipped with a protective grille 16. The guide channel 7 extends almost all the way around the wheel 4 and almost fully houses said wheel, such that dust particles emitted by the vehicle itself and resuspended dust particles in the guide channel 7 remain in said guide channel. The guide channel 7 thus virtually forms a wheel housing, with a covering element 15 being provided at a visible side 2 situated opposite the wheel well 3, a lower edge of which covering element, close to the roadway, is visible in FIG. 1.

A wheel rotation is illustrated by means of the rotation arrow 17. In the exemplary embodiment illustrated, forward travel of the vehicle 1 is indicated, in the case of which dust particles are resuspended from a roadway surface 18 and enter the guide channel 7 through the rear-side inlet opening 13, as indicated by the arrow 19.

The guide channel 7 has guide elements 21 that are oppositely curved. By way of example, the guide elements 21 extend along the guide channel 7 and are alternately concavely and convexly curved. As illustrated in FIG. 1, those guide elements 21 which are arranged closer to the tread of the wheel 4 in the plane of the drawing are concavely curved, whilst those guide elements 21 which are further remote from the tread of the wheel 4 in a radial direction than the inner guide elements 21 are convexly curved. The flow effect owing to the guide elements 21 arranged in the guide channel 7 is indicated by the arrows 22. The particles are separated off by means of the guide elements 21.

At its respectively lower end in the plane of the drawing, that is to say in an area close to the roadway, the guide channel 7 has the collecting element 9. The collecting element 9 is designed as a collecting channel. The collecting element 9 extends along a lower edge, arranged in the plane of the drawing of FIG. 1, of the wheel well 3.

The liquid-spraying system 8 has a liquid reservoir 23 that is arranged below a filter element 24 in the capturing container 12. Extending from the liquid reservoir is a conveying line 26 in which a fine filter 28 is arranged upstream of a pump 27, which may be designed as a high-pressure pump. The pump 27 conveys a spray liquid via a line 29 to a spray nozzle 31, which atomizes the spray liquid in the guide channel 7, as indicated in FIG. 1. The liquid-spraying system 8, in particular its spray nozzle 31, may be connected to a high-voltage source, such that the liquid droplets that are generated are charged. When no liquid is being atomized by the spray nozzle, the high-voltage source could nevertheless charge liquid droplets in the air via the spray nozzle, for example in rainy conditions or in the presence of high air humidity.

In the exemplary embodiment illustrated, two spray nozzles are optionally provided, with one being arranged at the rear-side inlet opening 13 and the other, optional spray nozzle 31 being arranged for example at the zenith of the guide channel 7. A line connection from the pump 27 to said spray nozzle 31 arranged at the zenith is not illustrated. The particles that have entered the guide channel 7 are thus moistened and are separated off in the guide channel 7, in particular at the guide elements 21, inter alia owing to the electrostatic attraction. The moistening of the scraper plates expediently prevents collected particles from bouncing off and becoming detached from the guide channel 7 and guide elements 21. The liquid-particle mixture thus passes into the collecting element 9, wherein a scraper may optionally also be provided.

The conveying system 11 has a conveying means 32 and a discharging conveying means 33. The conveying means 32 is designed as a screw conveyor, preferably with a flexible shaft, with the discharging conveying means 33 likewise being designed as a screw conveyor. The conveying means 32 is arranged in the collecting element 9 and extends as a continuous conveying means along the extent of the collecting element 9. The conveying means transports the collected the liquid-particle mixture to a collecting point 34 to which the discharging conveying means 33 is connected. The discharging conveying means 33 transports the collected liquid-particle mixture to the capturing container 12.

The capturing container 12 may be arranged on, preferably fastened to, an underbody. At the capturing container 12, there is arranged a measuring system which firstly, by means of a filter sensor 36, monitors the loading of the filter element 24 with tire/dust particles and secondly, by means of a liquid level sensor 37, monitors the liquid level in the liquid reservoir 23. The two sensors 36, 37 are connected to a control unit 38. The reference designations of the two sensors 36, 37 are, for the sake of clarity, assigned to the schematically illustrated connections (which may be of wired or wireless form) to the control unit 38. The illustrated connection of the control unit 38 to the pump 27 may also be of wireless or wired form. The control unit 38 generates signals for the operation of the liquid-spraying system 8, and is also connected to other sensors such as rain sensors, speed sensors, steering angle sensors, longitudinal and/or lateral acceleration sensors, tire pressure sensors, tire rotational speed and torque sensors, temperature sensors and/or air humidity sensors. Devices that estimate dust emissions using camera means, and/or sensor-based wheel well measurements, and/or GPS data, may also be used. The respective sensors may be connected to the control unit 38 in wired or wireless fashion. The control unit 38 may be integrated into a central control unit of the vehicle 1. Each sensor can transmit a measurement result to the control unit 38, with which it can be decided how the liquid-spraying system 8 is actuated, that is to say activated or kept in an activated state or deactivated or kept in a deactivated state. The conveying system can also be actuated independently of the pump.

The device 6 for capturing dust particles that are generated and/or resuspended by movements, in particular of a wheel 4 of the vehicle, can be arranged at each wheel of the vehicle 1. It is favorable here for only a single capturing container 12 to be provided, with the respective discharging conveying means establishing the connection to the respective collecting elements. It is however also conceivable for multiple capturing containers to be provided for capturing the dust that is generated/resuspended by the front wheels and by the rear wheels. In the case of a four-wheeled vehicle, it would thus be possible for four capturing containers to be provided. It would however also be possible for in each case only one to be provided for the two front wheels and for the two rear wheels, such that only two capturing containers would be present.

Figure 2:
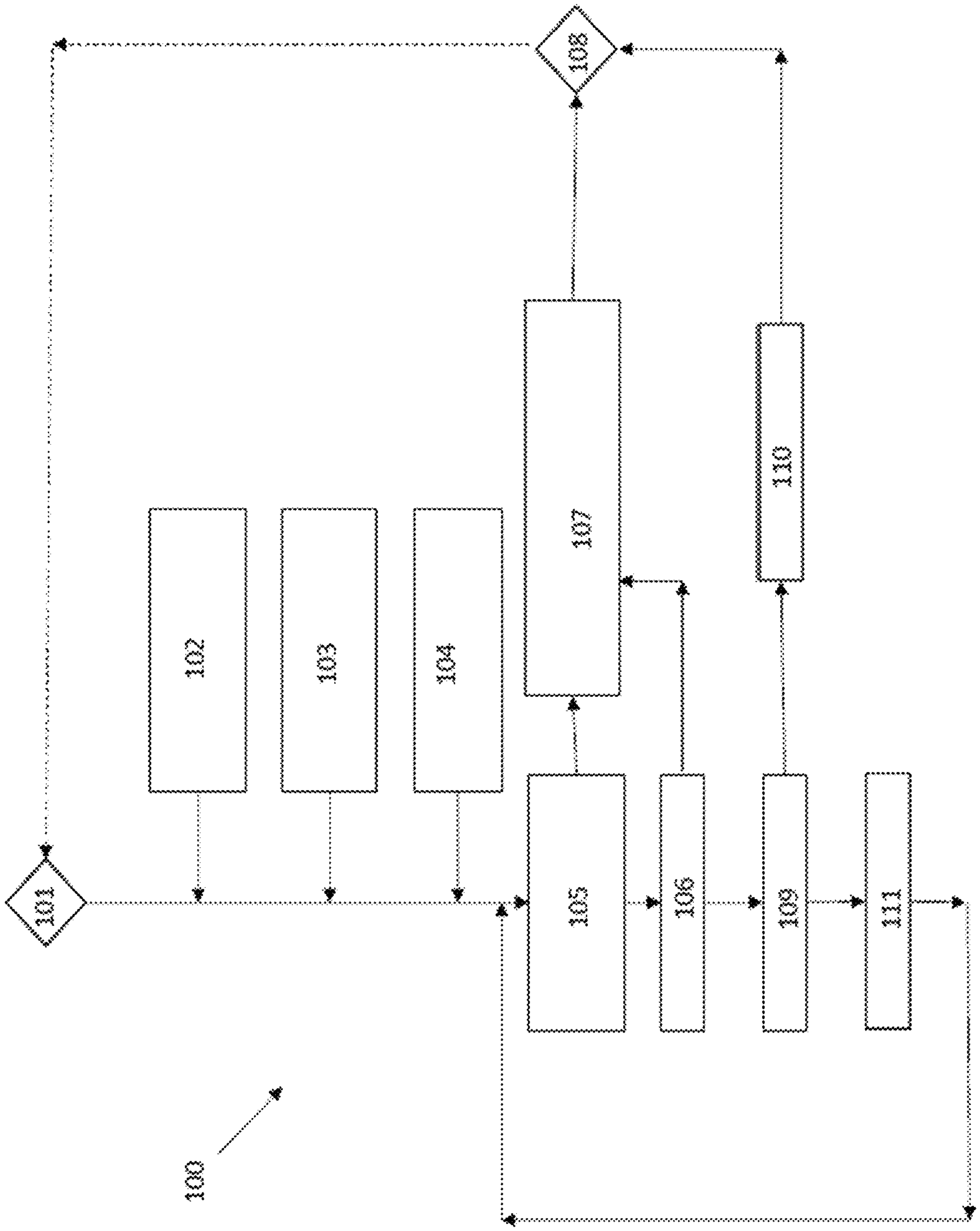
FIG. 2 shows an exemplary flow diagram of a method for operating a vehicle having such a device.

FIG. 2 illustrates an exemplary flow diagram 100 for the operation of the device 6 for capturing dust particles that are generated and/or resuspended by movements, in particular of a wheel 4 of the vehicle. The exemplary flow diagram 100 is stored or integrated in the control unit 38.

The method is started at the start block 101.

Data from the sensors assigned to the collecting element, from the liquid level sensor 37 of the liquid reservoir 23 and from the filter sensor 36 are transmitted to the control unit 38, as illustrated by the block 102. Data from the rain sensors, speed sensors, steering angle sensors, longitudinal and/or lateral acceleration sensors, tire pressure sensors, tire rotational speed and torque sensors, temperature sensors and/or air humidity sensors are also transmitted to the control unit 38, as illustrated by the block 103. Estimates of dust emissions obtained using camera means, and/or sensor-based wheel well measurements, and/or GPS data, may also be supplied to the control unit 38, as illustrated by the block 104.

In the control unit 38, the transmitted data are processed, and control signals are generated.

If it is identified that a dust limit value has been exceeded, for example in the course of an estimation of tire wear and/or if resuspension of dust from the roadway surface is expected, for example on the basis of the signals from the speed sensor, that is to say from the fact that a minimum speed has been exceeded, for example, a condition for activating the liquid-spraying system 8 is satisfied. This condition is checked in step 105. If this condition is satisfied, the method is continued with step 106. If the condition is not satisfied, the liquid-spraying system 8, that is to say the pump 27, remains inactive, which is decided in the step 107. The method ends at the end block 108, and begins again at the start block 101.

In step 106, it is checked whether or not the conditions in the surroundings of the vehicle 1 necessitate a generation of atomized liquid droplets by means of the spray nozzle 31. It is expedient for this purpose for the data from the rain sensors and/or the air humidity sensors, for example, to be available. If it is raining, or if the air humidity is so high that the resuspended/generated dust particles are sufficiently moistened, the liquid-spraying system 8, that is to say the pump 27, remains inactive, which is decided in the step 107. The method ends at the end block 108, and begins again at the start block 101.

If it is not raining, or if it is identified that the air humidity is too low to separate off or to moisten particles, then it is checked in step 109 whether the fill level of the liquid reservoir 23 is sufficient for operation. The data from the liquid level sensor 37 are expedient for this purpose. If said liquid level sensor indicates a fill level below a specified minimum fill level, the liquid-spraying system 8, that is to say the pump 27 thereof, remains inactive. The method moves to the block 110, in which a signal is generated for the vehicle user to the effect that the liquid reservoir 23 should be filled. From the block 110, the method moves to the end block 108, from where the method moves to the start block 101 if the liquid reservoir 23 has been filled, which is detected by means of the liquid level sensor 37. The block 110 may also be referred to as a human-machine interface, which directly generates a signal for the vehicle user. The signal may be output as text information on a screen. An acoustic indicator may also be output. If the liquid reservoir 23 has been filled, for which a filling apparatus 39 shown in FIG. 1 is provided, the indicator is cleared, and the method moves to the start block 101.

If the condition that sufficient spray liquid is present in the liquid reservoir 23 is met, the liquid-spraying system 8, that is to say the pump 27 thereof, is activated (step 111). The particles that have been collected in the guide channel 7 are moistened and are separated off. If the high-voltage source is activated at the same time as the activation of the pump 27, the separating action is facilitated. The method moves from step 111 back to step 105, and the respective conditions are checked once again.

The liquid-particle mixture passes into the collecting element 9. This is also the case when it is raining or when particles are being separated off in some other way. If the control unit 38 has detected, by means of the collecting element sensors, that the collecting elements 9 have reached a particular fill level, the conveying means 32 and the discharging conveying means 33 are activated, such that the collecting element 9 is emptied and the material to be conveyed is transported in the direction of the capturing container 12. When the collecting element 9 has been emptied, the conveying means 32 and discharging conveying means 33 are deactivated. It is however expedient for the conveying means 32 and the discharging conveying means 33 to also be activated at the same time as the activation of the pump 27, and for both to be left active for the entire duration for which the pump 27 is active.

It should be understood that, on the premise of technical feasibility, the technical features listed above for different embodiments can be combined with each other to form other embodiments within the scope of the present disclosure.

It should be understood that, on the premise of technical feasibility, the technical features listed above for different embodiments can be combined with each other to form other embodiments within the scope of the present disclosure.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle assembly that captures dust particles, comprising:
- a wheel well having a guide channel that has at least one inlet opening, the wheel well disposed about a wheel of a vehicle;
- a liquid-spraying system that sprays a liquid onto dust particles within the guide channel; and
- a collecting element arranged at the guide channel, the collecting element having a conveying system, the conveying system connected to a capturing container.

2. The vehicle assembly of claim 1, wherein the wheel is fully housed by the guide channel.

3. The vehicle assembly of claim 1, wherein the guide channel has a multiplicity of guide elements.

4. The vehicle assembly of claim 1, wherein the liquid-spraying system has at least one spray nozzle.

5. The vehicle assembly of claim 1, wherein the liquid-spraying system is connected to a voltage source.

6. The vehicle assembly of claim 5, where the voltage source is a high-voltage source.

7. The vehicle assembly of claim 1, wherein the collecting element is designed as a collecting channel.

8. The vehicle assembly of claim 1, wherein the conveying system has a screw conveyor that is arranged in the collecting element.

9. The vehicle assembly of claim 1, wherein the conveying system has a discharging conveying means that is arranged between the collecting element and the capturing container.

10. The vehicle assembly of claim 1, wherein the capturing container is arranged on an underbody of the vehicle.

11. The vehicle assembly of claim 1, wherein the capturing container has a filter element and a liquid reservoir.

12. The vehicle assembly of claim 1, further comprising an outlet opening from the guide channel, the at least one inlet opening is rearward of the outlet opening relative to a general orientation of the vehicle.

13. The vehicle assembly of claim 1, wherein the liquid-spraying system has a liquid reservoir that is arranged vertically below a filter element in the capturing container.

14. The vehicle assembly of claim 1, further comprising a grille at the at least one inlet opening.

15. A vehicle assembly that captures dust particles, comprising:
- a guide channel extending from an inlet opening to an outlet opening, the guide channel disposed adjacent a wheel of a vehicle and configured to receive dust particles through the inlet opening, the dust particles generated by movements of the wheel, resuspended by movements of the wheel, or both;
- a plurality of guide elements disposed within the guide channel;
- a liquid-spraying system that sprays a liquid onto dust particles within the guide channel; and
- a collecting element having a conveying system, the conveying system configured to convey dust particles to a capturing container.

16. The vehicle assembly of claim 15, wherein some of the guide elements within the plurality of guide elements are concave, and some of the guide elements within the plurality of guide elements are convex.

17. The vehicle assembly of claim 15, wherein the guide elements within the plurality of guide elements that are closer to a tread of the wheel in a radial direction of the wheel are concave, and the guide elements within the plurality of guide elements that are further from the tread of the wheel in the radial direction are convex.

18. The vehicle assembly of claim 15, wherein the liquid-spraying system has a liquid reservoir that is arranged vertically below a filter element in the capturing container.

19. A vehicle assembly that captures dust particles, comprising:
- a guide channel arranged at a wheel well of a vehicle, the guide channel having at least one inlet opening;
- a liquid-spraying system including a spray nozzle that sprays a liquid within the guide channel;
- a collecting element arranged at the guide channel;
- a capturing container having a filter element and a liquid reservoir;
- a conveying system that conveys a liquid-particle mixture from the collecting element to the capturing container, wherein the filter element filters dust particles from the liquid-particle mixture such that filtered liquid passes to the liquid reservoir; and a pump that supplies the filtered liquid from the liquid reservoir to the spray nozzle.

20. The vehicle assembly of claim 19, wherein the spray nozzle is connected to a high-voltage source such that liquid droplets atomized by the spray nozzle are electrically charged.

* * * * *